(12) United States Patent
Steiner (10) Patent No.: US 8,903,891 B2
(45) Date of Patent: Dec. 2, 2014

(54) USER INTERFACE COMMUNICATION UTILIZING SERVICE REQUEST IDENTIFICATION TO MANAGE SERVICE REQUESTS

(75) Inventor: Matthias Steiner, Cologne (DE)

(73) Assignee: SAP SE, Walldorf (DE)

( * ) Notice: Subject to any disclaimer, the term of this patent is extended or adjusted under 35 U.S.C. 154(b) by 519 days.

(21) Appl. No.: 12/822,502

(22) Filed: Jun. 24, 2010

(65) Prior Publication Data
US 2011/0320521 A1 Dec. 29, 2011

(51) Int. Cl.
*G06F 15/16* (2006.01)
*G06F 9/54* (2006.01)
*G06F 9/44* (2006.01)

(52) U.S. Cl.
CPC .............. *G06F 9/547* (2013.01); *G06F 9/4443* (2013.01)
USPC ............................. 709/203; 726/22; 345/473

(58) Field of Classification Search
CPC ............................... G06F 9/547; G06F 9/4443
USPC .............. 709/203, 217–228; 726/22; 345/473
See application file for complete search history.

(56) References Cited

U.S. PATENT DOCUMENTS

| | | | | |
|---|---|---|---|---|
| 6,964,023 | B2 * | 11/2005 | Maes et al. | 715/811 |
| 7,590,639 | B1 * | 9/2009 | Ivanova et al. | 1/1 |
| 7,653,651 | B1 * | 1/2010 | Pavlov | 707/999.103 |
| 7,702,649 | B1 * | 4/2010 | Bresch et al. | 707/999.104 |
| 7,975,266 | B2 * | 7/2011 | Schneider et al. | 717/178 |
| 8,041,746 | B2 * | 10/2011 | Stuhec | 707/802 |
| 8,056,091 | B2 * | 11/2011 | Brunswig et al. | 719/315 |
| 8,060,544 | B2 * | 11/2011 | Werner et al. | 708/200 |
| 8,060,568 | B2 * | 11/2011 | Cohen et al. | 709/206 |
| 2007/0162560 | A1 * | 7/2007 | Jin | 709/217 |
| 2008/0015880 | A1 * | 1/2008 | Freedenberg et al. | 705/1 |
| 2008/0016516 | A1 * | 1/2008 | Brunswig et al. | 719/315 |
| 2008/0301243 | A1 * | 12/2008 | Cohen et al. | 709/206 |
| 2009/0006150 | A1 * | 1/2009 | Prigge et al. | 705/7 |
| 2009/0049200 | A1 * | 2/2009 | Lin et al. | 709/246 |
| 2009/0055468 | A1 * | 2/2009 | Burckart et al. | 709/203 |
| 2009/0132562 | A1 * | 5/2009 | Mehr et al. | 707/100 |
| 2009/0198756 | A1 * | 8/2009 | Werner et al. | 708/400 |
| 2010/0070336 | A1 * | 3/2010 | Koegler et al. | 705/10 |
| 2010/0082581 | A1 * | 4/2010 | Kreibe et al. | 707/706 |

(Continued)

OTHER PUBLICATIONS

"European Application Serial No. 11005011.9—EP Search Report mailed Oct. 31, 2011", 8 pgs.

(Continued)

*Primary Examiner* — Haresh N Patel
(74) *Attorney, Agent, or Firm* — Schwegman Lundberg & Woessner, P.A.

(57) ABSTRACT

Apparatus, systems, and methods may operate to receive a first service request for data from a user application executing on at least one first machine and, in response to the receiving, synchronously transmit a service request identification to the user application in reply to the first service request, as well as dispatching the first service request as an additional request to an application layer executing on at least one second machine. Further activities may include notifying the user application that a second response, including the data, is available for consumption (after receiving a response to the additional request), receiving a second service request from the user application, along with the service request identification, and synchronously transmitting the second response to the user application in reply to the second service request. Additional apparatus, systems, and methods are disclosed.

19 Claims, 5 Drawing Sheets

(56) References Cited

U.S. PATENT DOCUMENTS

| | | | |
|---|---|---|---|
| 2010/0100952 A1* | 4/2010 | Sample et al. | 726/9 |
| 2010/0153149 A1* | 6/2010 | Prigge et al. | 705/7 |
| 2010/0153150 A1* | 6/2010 | Prigge et al. | 705/7 |
| 2010/0186020 A1* | 7/2010 | Maddhirala et al. | 718/105 |
| 2010/0287555 A1* | 11/2010 | Thormaehlen et al. | 718/102 |
| 2010/0287570 A1* | 11/2010 | Mock | 719/328 |
| 2010/0333072 A1* | 12/2010 | Dulip et al. | 717/128 |
| 2011/0077999 A1* | 3/2011 | Becker et al. | 705/10 |
| 2011/0225143 A1* | 9/2011 | Khosravy et al. | 707/713 |
| 2011/0307295 A1* | 12/2011 | Steiert et al. | 705/7.29 |
| 2011/0307358 A1* | 12/2011 | Rumig et al. | 705/30 |
| 2011/0307363 A1* | 12/2011 | N et al. | 705/35 |

OTHER PUBLICATIONS

Liu, Yan, et al., "An Empirical Evaluation of Architectural Alternatives for J2EE and Web Services", Proceedings of the Asia-Pacific Software Engineering Conference, Dec. 31, 2004, 10-17.

Rainey, Rick, "Making asynchronous service calls from a WinForm client", [Online]. Retrieved from the Internet: <URL: http://blogs.msdn.com/b/rickrain/archive/2009/03/18/making-asynchronous-service-calls-from-a-winform-client.aspx>, (Mar. 18, 2009), 4 pgs.

* cited by examiner

USER INTERFACE COMMUNICATION UTILIZING SERVICE REQUEST IDENTIFICATION TO MANAGE SERVICE REQUESTS

COPYRIGHT

A portion of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data described below and in the drawings and appendices that form a part of this document: Copyright 2010 SAP AG of Walldorf, Germany. All Rights Reserved.

BACKGROUND

In web-based user interfaces, including those that make use of the HyperText Transfer Protocol (HTTP), synchronous communication patterns do not permit the server to push information to the client. As a result, requests placed by the client can result in a blocked or "frozen" user interface (UI) that is unable to continue processing user input until a response to the request is made available by the server.

BRIEF DESCRIPTION OF THE DRAWINGS

Some embodiments are illustrated by way of example and not limitation in the figures of the accompanying drawings, in which.

DETAILED DESCRIPTION

To add greater flexibility to the UI, various embodiments permit user requests to be processed by back end systems to be managed in a new way, with a unique orchestration of communication patterns. Thus, while the UI consumes a synchronous request processing mechanism, in reality, parallel asynchronous consumption of requests is enabled. In some cases, advanced middleware (e.g. an Enterprise Service Bus) can be used to dispatch requests using multi-casting, without changing the UI coding.

In some embodiments, communication details are encapsulated in a separate application layer (e.g., a Back End Connectivity Layer) and hidden from the Business Logic Layer. An asynchronous proxy is used to parallelize service calls to back end systems. As a consequence, the user can continue working at the UI while one or more service requests are processed by the back end systems.

Once data becomes available from the back end systems, a "pseudo"-push (e.g., using frequent polling with minimal-footprint technology, such as the real-time messaging framework forming a portion of the SAP NetWeaver® Enterprise Portal) is enabled to inform the UI that a response has been returned by one of the back end systems. The UI then pulls the response data from a temporary data store and displays it to the user. In this way, a one-way web service proxy can be used to convert the synchronous call from the UI (which blocks the call until the response is returned) into an asynchronous call to the back end systems (which releases the thread that processes the call, as well as the UI).

For example, in some commercial environments, the users are material resource planners (MRPs), whose job it is to make sure that enough spare parts are in stock to ensure production. Some of these environments include numerous plants that span the globe—each having their own enterprise resource planning (ERP) systems plus additional legacy systems (e.g. acquired by acquisitions, mergers, etc.). These MRPs may therefore operate to maintain material data within multiple plants.

As part of the data maintenance function, the MRPs might log into several systems, executing the same task sequentially in each of them. Without the use of various embodiments, these users might then execute a global query for materials, and the corresponding call would be dispatched synchronously and sequentially to all connected systems. The responses would then be accumulated, with the user waiting until all systems responded to receive the results (in a single request/response cycle). However, using the various embodiments described herein, MRPs can use a single global cockpit to multi-cast requests to all of the connected systems, and continue to work as the results from several systems are made available (using multiple, asynchronous request/response cycles) leading to greater efficiency.

Thus, the various embodiments permit technical communication details to be cleanly separated from the query interface. Essentially, they are hidden from the user. The UI is therefore able to present individual responses from connected systems as they are returned—more or less immediately presenting the data as it becomes available. This allows the user to begin working even when only one system has returned data in response to multiple requests, addressed to multiple systems. An example of the interaction between system components will now be given.

A (query) service operation interface is defined that includes a dedicated request structure and a dedicated response structure. The service implementation operates to determine whether a service request identification (ID) has been provided within a request structure that has been received. If an ID is not provided, then a new query is triggered by dispatching the request to one or more asynchronous proxies. A new service request ID is generated and returned within the response structure, and the first request/response cycle is closed. The service request ID can be a GUID (Globally unique ID) generated using a standard Java class, for example. At this point, the UI is again ready for interaction with the user. If an ID is provided, then the response for that ID is returned (assuming it is still available).

The asynchronous proxies are in charge of calling connected systems. The user does not need to know which systems are connected. Once a proxy has received a response from a connected back end system, the response is stored in temporary storage, along with the ID used to uniquely identify the corresponding request. The proxy then sends a notification to the UI, that a response corresponding to the given ID is now available. This can be implemented in the form of a "pseudo-push", realized using a low-footprint frequent/automated poll that operates in accordance with the limitations of the HTTP protocol.

Once the UI is notified of the availability of a new response, the UI can execute the service request operation again, this time using the ID that has been previously generated. This will open a second request/response cycle that should be rapidly closed due to the availability of the stored response. In this way, the UI is not blocked waiting for one or more responses from multiple back end systems.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 1:
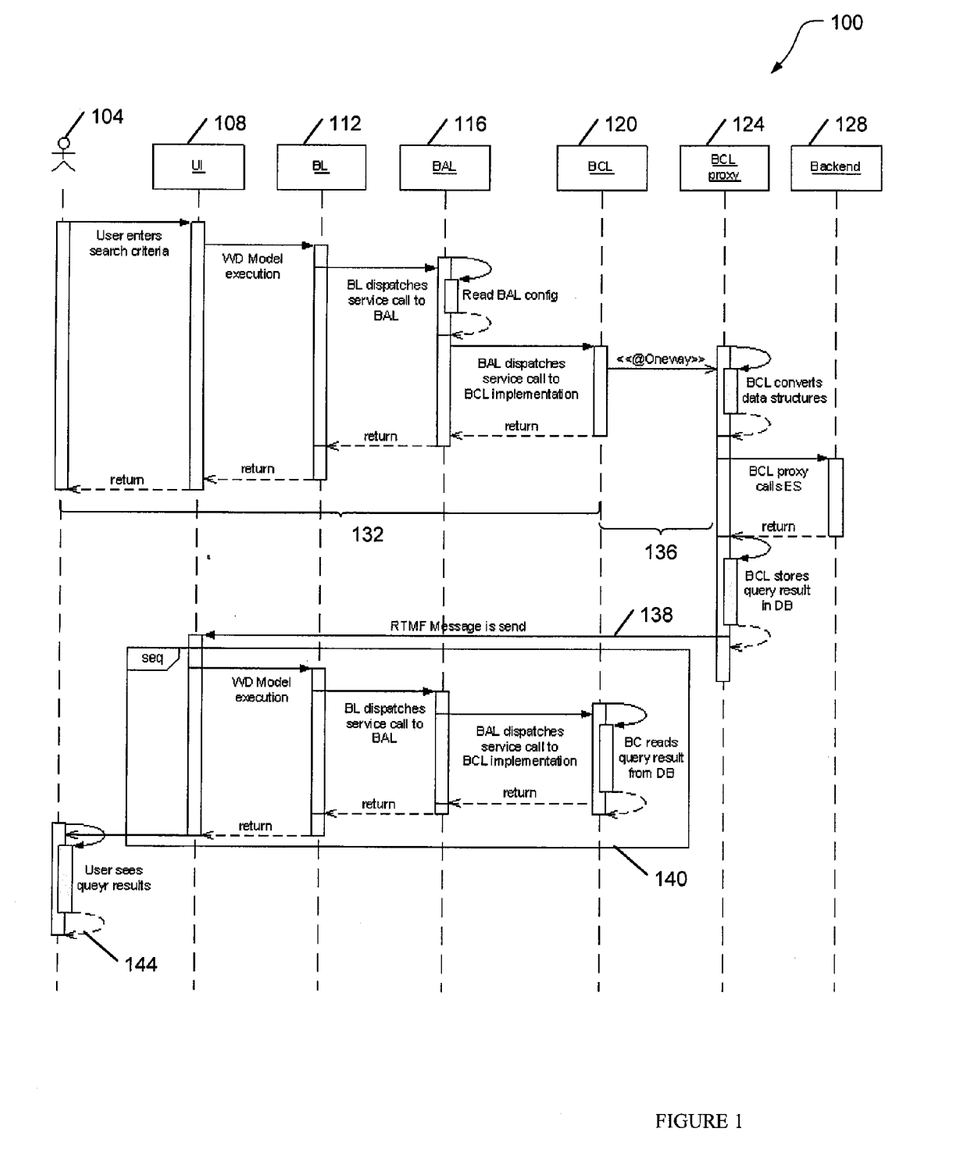
FIG. 1 illustrates user interface communication and request processing, according to various embodiments of the invention.

FIG. 1 illustrates UI communication and request processing 100, according to various embodiments of the invention. In this case, one possible implementation of the processing flow of user 104 interaction through application layers is shown, with an overview of the vertical building blocks of the application.

The UI layer 108 can be developed using various software modules, including the Web Dynpro for Java (WD4J) software available from SAP AG of Walldorf, Germany. The components contain controller coding for presenting information to the user. Complex logic may be disposed elsewhere, perhaps following traditional multi-tier application design principles.

In principle, the business logic (BL) layer 112 may be separated into four distinct components, each represented by a composite application development component (DC), which itself consists of multiples DCs. For example, the WD model component may have DCs that contain commonly used data structures for the composite applications within the BL layer 112.

The BL layer 112 may have DCs that contain the business logic of the user cockpit. These may provide services, perhaps implemented as Stateless Session Beans (SLSB), to the UI layer 108. These AS may be designed to obey the general guidelines for Enterprise Services (ESs), including Java-based ESs.

The AS may or may not implement processing logic; requests may be dispatched to other components. Thus, requests that are specific to the cockpit can be dispatched to the Backend Abstraction Layer (BAL) 116.

The BAL 116 operates to provide loose coupling between the BL layer 112 and the services that are consumed in back-end systems; this layer encapsulates the technical aspects of the service communication. As such, the BAL 116 acts as a facade for the BL layer 112 and dynamically dispatches service requests to a configured proxy residing in the Backend Connectivity Layer (BCL) 120. Thus, the BAL 116 may do little more than calling an SLSB with a Java Naming and Directory Interface (JNDI) name, using a lookup operation and the BAL 116 configuration. In this way, the SLSB implements the same interface as the BAL 116 service dispatching the request. In a sense then, the BAL 116 service calls itself, using a different JNDI name to point to the BCL 120 implementation.

The BCL 120 mediates communication between the service interface used by the BL layer 112 and the BCL 116, and the domain-specific interface of the consumed services. Technical details, such as receiver determination, synchronous and asynchronous communication specifics, and parallelization of the back end system 128 communication are also handled by this layer (so as to be hidden from the BL layer 112), via the BCL proxy 124.

The overall solution may thus comprise a plurality of software module add-ons, each encapsulating various aspects of the control functionality. For example, the functionality provided by some embodiments can be implemented in the form of a cockpit that is intended to provide a central view of various operations, such as material control, relating information across all connected systems.

Thus, it can be seen in FIG. 1 that during a first portion 132 of request processing, query criteria are passed from the UI layer 108 toward the BCL 120 without a service request ID. The service request ID is then generated and returned to the UI layer 108 as part of this same portion 132.

During a second portion 136 of the request processing, the BCL proxy 124 converts the synchronous request into an asynchronous request, to be processed by the back end systems 128. When a response is available, a message 138 is transmitted to the UI layer 108, to be stored temporarily, and received by the proxy 124.

During a third portion 140 of the request processing, the original query criteria is passed on to the proxy 124, along with the previously-generated service request ID. In this case, the response is returned, along with the service request ID, to the UI layer 108. The query result, which is the response to the original request, and which includes data requested in the original request, is then presented to the user 104 at the conclusion 144 of the process 100.

Figure 2:
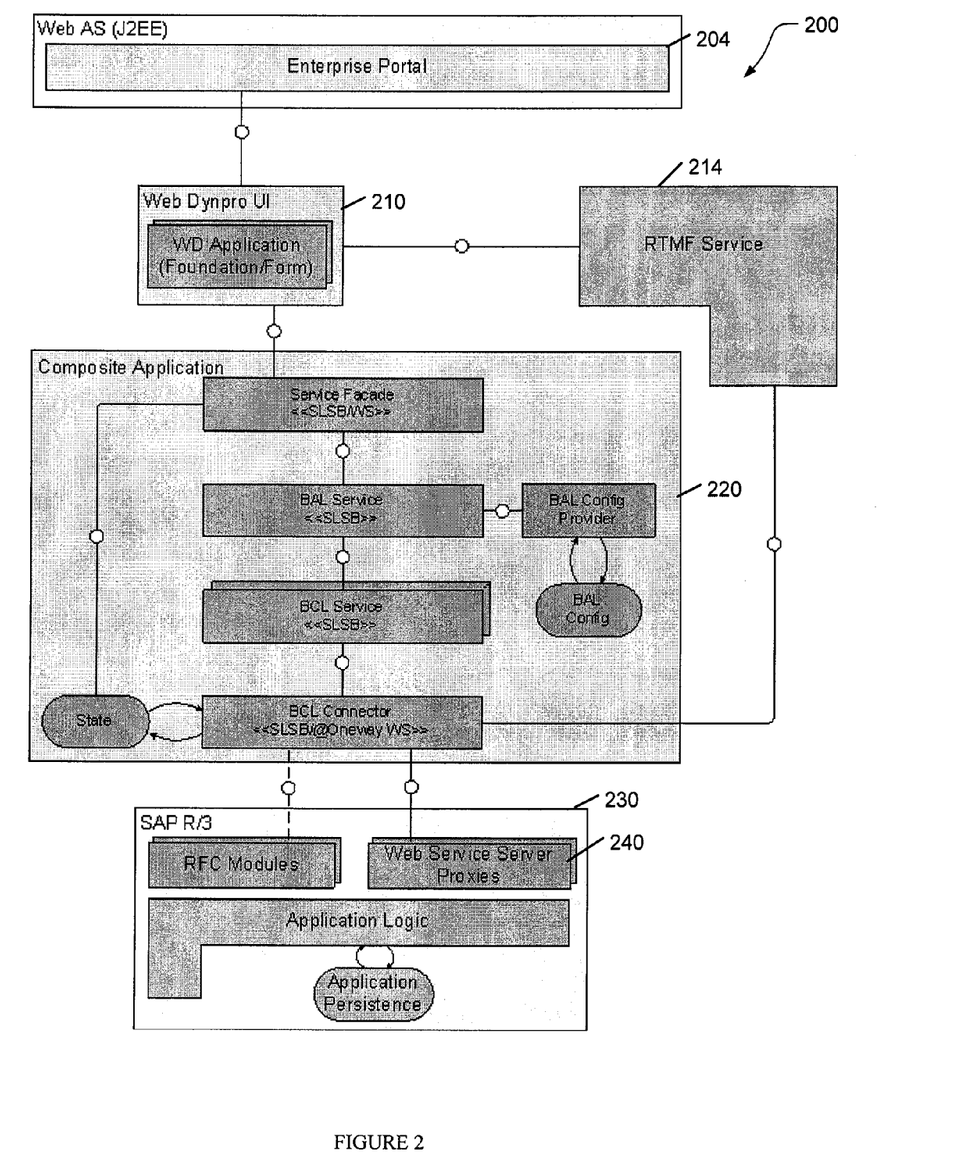
FIG. 2 illustrates a system for request processing according to various embodiments of the invention.

FIG. 2 illustrates a system 200 for request processing according to various embodiments of the invention. Here it can be seen that a single enterprise portal 204 provides user control via the UI 210. In some embodiments, the UI 210 is notified via the real time messaging framework (RTMF) service 214 to perform the pseudo-push operation. For each query (e.g., presented as a service request), a dedicated query service may exist that is modelled according to the anatomy of ESs, and which permits exposing web services to be consumed by other clients as well, not just the UI 210. These web services, by implication, behave in "black-box" fashion, so as to be self-sustaining from an external point of view.

The BL layer 220 does not necessarily need to contain any business logic in the classical sense. In some embodiments, the BL layer 220 simply dispatches incoming requests to the BAL 230, via one or more proxies 240. As noted previously, the BAL 230 provides an abstraction layer that hides domain-specific business semantics and communication details from the BL layer 220 (as well as from the UI 210, and portal 204). As such, the BAL 230 dispatches service calls based on configuration data dynamically to Backend Connectivity Layer (BCL) implementations, which map the data structures used by the BL layer 220 to domain-specific data types used by the backend services that eventually process the user requests. Thus, in some embodiments, all technical communication details are handled within the BCL (shown in the figure as comprising the BCL Service and the BCL Connector).

In order to improve the request processing turnaround time and the resulting user experience, calls to connected systems may be dispatched asynchronously, in parallel. Thereafter, once a response is received from any backend system, the returned data (or error messages) may be temporarily stored, and the UI 210 is informed upon arrival of the data with a previously-generated service request ID. The UI 210 may operate to poll for the data by re-using the same service used to initiate the first query, the difference being that the service request ID is passed along to the back end when the request is re-opened.

In this way, the request can be passed down the call stack a second time until it reaches the BCL. Because a service request ID has been specified, the BCL will not re-present the query to the back end systems. Rather, the stored result corresponding to the service request ID will be returned in a predefined return message structure.

Using the BAL concept, request information may be consumed by a variety of backend systems. The BCL may be used to convert the domain-specific data types defined in the back end systems to the data types used within the composite. Thus, the BCL can provide meta-data retrieval functionality, including supported search criteria, data types, field-length, etc.

For example, the user may start multicast search activity by pressing a 'Search button' widget (or some other default button). This activity triggers WD Model execution of the application service. During the time a search is pending (and before all results have been returned), the search criteria fields and the search button can be disabled to avoid a race condition. The user can also manually cancel the search process at any time, ignoring future query result notifications arising from a particular request.

A timeout period can be configured for the application in order to avoid blocking the UI. If a query has not successfully returned data from all participating back end systems within the timeout period, the query can be cancelled by the system and a corresponding warning message shown to the user. The user may also reset all search criteria on-demand by pressing a 'Reset' button widget.

Responses received from the individual back end systems can be displayed in tab-control like containers. These might include, for example, an overview tab and one tab per system (assigned to the currently logged-in user). A toolbar may reside on top of the result table, providing access to data-centric activities, such as export and backend navigation.

The table data may be sorted according to a sort order specified by the user. In some embodiments, a generic multi-column sorting dialog is provided. Thus, if a column participates in the column sort algorithm, its visual representation may reflect this implementation by showing the sort order index with brackets or some other indicator.

The tabs may also display the number of returned records in brackets (or using some other indicator). Generally, columns in the result table can be filtered (e.g., using inline filtering). The result data may be filtered on the UI layer. In most embodiments, it is possible to maintain filter criteria while a search is currently pending as soon as the first system returns a result set.

The business logic layer may be used to dispatch service calls to either the underlying Backend Abstraction layer or to the common BL layer. After the query result for a query request has been received, it can be post-processed for sorting. In some embodiments, the BLL is capable of internal filtering and sorting to adhere to the appearance of a black-box implementation.

The BAL can be designed to dispatch incoming service requests to the currently configured BCL implementation. Based on the returned implementation name, a JNDI call may be executed to lookup the Session Bean implementation.

The BCL may be designed as the location where technical aspects of parallel communication with the back end systems are handled. Based on an outside-in approach, the components of the BCL may include the implementation for a given service interface (e.g., as a Stateless Session Bean). The representation defines a dependency to a generated Web Service Client (e.g., a Web Service Consumer Proxy) based on Dependency Injection annotation. The corresponding Web Service operation may be annotated (e.g., with the @Oneway annotation), with no response message. The annotation tells the container that the current thread can continue its processing logic without waiting for a response. The beans may operate to retrieve system aliases for all the systems assigned to the currently logged-in user. Inside a loop, the Web Service proxy may be called n-times, each time using a different system alias. In this way, the operations of the proxy are annotated, allowing for parallel execution. The proxy itself may define yet another reference (e.g., @WebServiceRef) to the consumer proxy of the ES. Message-driven beans and Java Message Service (JMS) may also be used.

It is assumed that in some embodiments, for each connected system a logical binding port is configured that matches the name of the system alias. This binding port is then used to execute the ES call. Once a response message is received (or an error occurs), the result can be saved in a corresponding database table. Then a RTMF event is initiated to inform all registered event message recipients of the result, perhaps presenting several message parameters (of which one may be the service request ID). The recipient of this service request ID can then poll for the result data by executing the same operation, this time including the service request ID. The BCL implementation may then operate to retrieve the result (e.g., as a data set or error message), and return it as part of the predefined response output structure. Thus, many embodiments may be realized.

Figure 3:
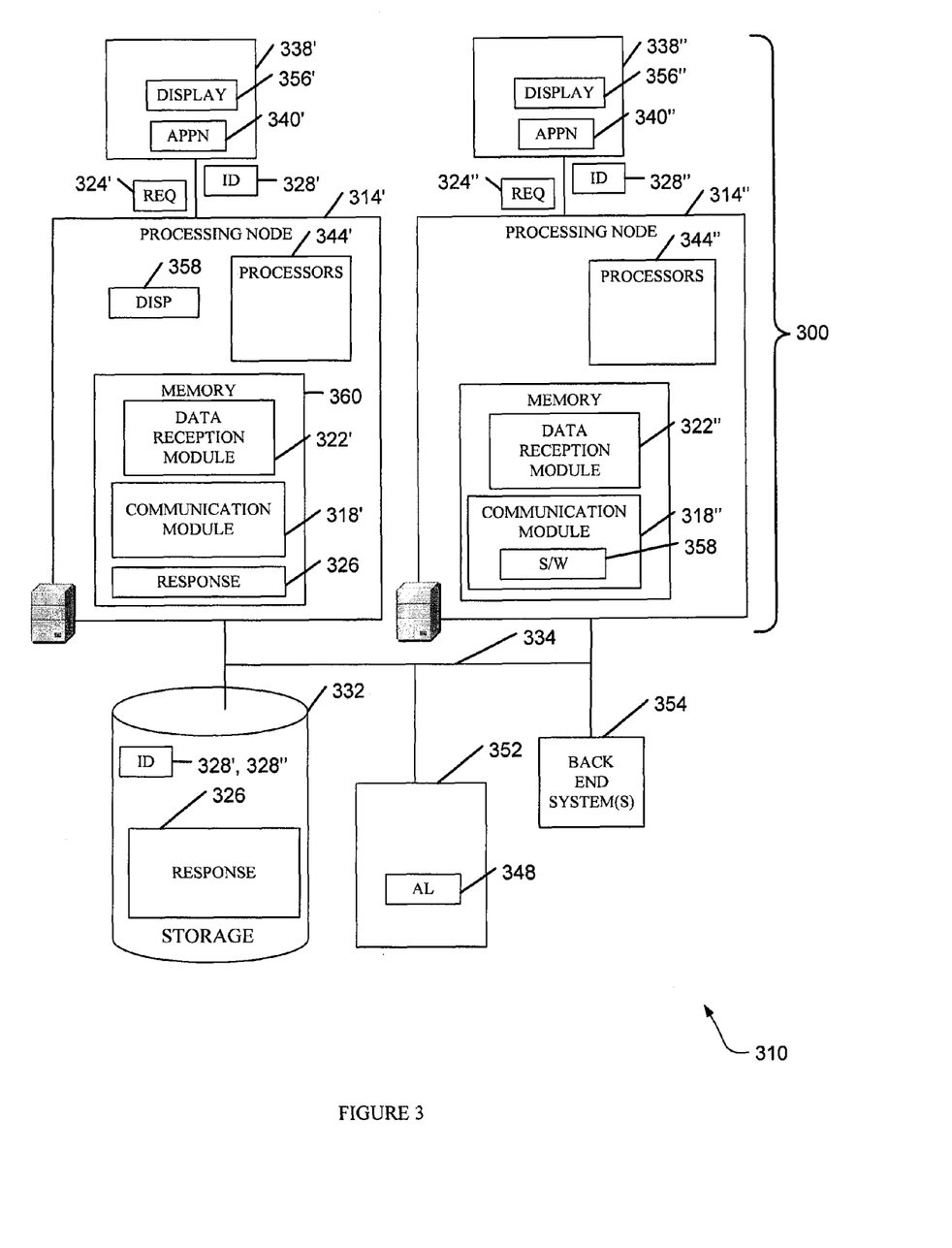
FIG. 3 is a block diagram of apparatus and systems according to various embodiments of the invention.

For example, FIG. 3 is a block diagram of apparatus 300 and systems 310 according to various embodiments of the invention. It should be noted that the apparatus 300 may comprise multiple similar or identical elements. These elements are indicated using single prime and double prime marks, in conjunction with the numeric label. For example, a first processing node is shown as node 314', and a second processing node is shown as node 314". Likewise, a first set of processors is shown as processors 344', and a second set of processors is shown as processors 344". In many embodiments, such components are interchangeable.

Thus, in some embodiments, an apparatus 300 that enables UI communication, with synchronous to asynchronous conversion of requests, comprises one or more processing nodes 314', 314" that include a data reception module 322', 322" to receive a stateless service request 324', 324" for data from a user application 340', 340" executing on at least one first machine (e.g., a desktop computer or some other node 338', 338") to open a first request operation. The apparatus 300 may further include one or more communications modules 318', 318" to communicate with the data reception module(s) 322', 322", the communications module(s) 318', 318" to synchronously transmit service request identifications (IDs) 328', 328" to the user application(s) 340', 340" in reply to the first time the request 324', 324" is sent. The data reception modules 322', 322" and the communication modules 318', 318" can both transmit and receive information, between each other and with other entities, as needed.

This activity results in closing the first request operation and dispatching the service request 324', 324" as an (additional) asynchronous request to an application layer 348 executing on at least one second machine 352 (e.g, in communication with one or more back end systems 354). When a response to the additional request is received, the user application 340', 340" may be synchronously notified that a (second) response 326 to the original request, including the requested data, is available for consumption. The apparatus 300 may then operate to receive a stateless service request 324', 324" from the user application 340', 340", along with the service request identification 328', 238", to open a second request operation, and to synchronously transmit the response 326 to the user application 340', 340" in reply to the second time the request 324', 324" is sent, closing the second request operation.

One or more displays may be used to display the response 326. Thus, the apparatus 300 may comprise a display 356', 356" to display at least a portion of the response 326. The apparatus 300 may also comprise a display module 358 to display (perhaps by feeding data to one of the displays 356', 356") a UI comprising a portion of the data forming part of the response 326.

Multiple processors may be used within the apparatus 300 to divide up the processing tasks. Thus, the apparatus 300 may comprise multiple processors 344', 344", wherein the processing node (e.g., node 314') comprises a first one of the multiple processors 344', and wherein the communications module 318" comprises a software module 358 to be executed by a second one of the multiple processors 344".

The service request 324', 324" may be received by a server, or a client. Thus, the processing nodes 314', 314" may comprise servers and/or clients.

The apparatus 300 may comprise a persistent storage medium, such as a memory 360, to store the response 326, data requested in the first service request. The apparatus 300 may also take the form of a desktop or laptop computer, a cellular telephone or personal digital assistant (PDA), a server, a client, and other devices. Additional embodiments may therefore be realized.

For example, a system 310 may comprise multiple processing nodes, such as more than one of the apparatus 300. Thus, a system 310 may comprise a first processing node 314' that includes a data reception module 322' to receive a stateless service request 324' as described previously. The system 310 may also comprise a second processing node 314" with a communications module 318" to communicate with the data reception module 322', and to synchronously transmit a service request ID 328' to the user application 340' in reply to the first time the request 324' is sent. Additional operations may occur, as described with respect to the individual apparatus 300, with the addition of communications occurring between the two nodes 314', 314".

In some embodiments, the system 310 includes a storage node. Thus, the system 310 may comprise a storage node 332 to store the response 326 to the first service request as one or more portions, each of the portions to be provided by a separate backend system 354.

The system 310 may include a user interface device, such as a mouse, keyboard, or touch screen that is used to enter data that forms part of the stateless service request 324'. Thus, the system 310 may comprise a user interface device (e.g., a touch screen forming part of the display 356') coupled to the first processing node 314' to receive data, at least a portion of which is to be incorporated into the stateless service request 324'.

The system 310 may also comprise one or more backend systems 354 to generate the response 326, and to transmit the response 326 to the application layer (perhaps embodied by the machines 338', 338" and/or the processing nodes 314', 314").

The nodes of the system 310 may comprise physical nodes, virtual machines, and combinations of these. The system 310 may include multiple servers and clients. Thus, the first processing node 314' may comprise a client node, and the second processing node 314" may comprise a server node, and vice versa. Any and all nodes may be communicate via one or more networks 334. Still further embodiments may be realized.

Figure 4:
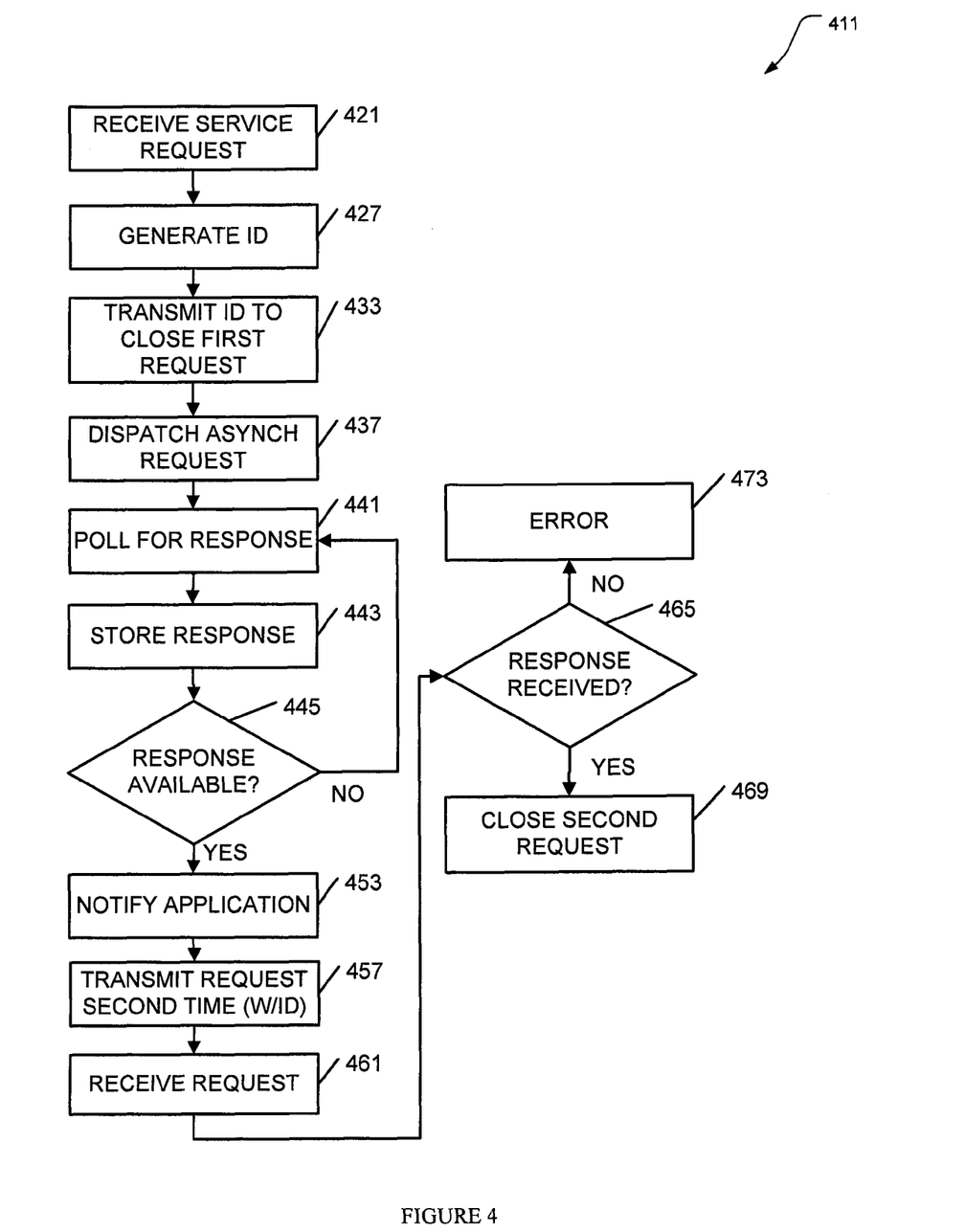
FIG. 4 is a flow diagram illustrating several methods according to various embodiments of the invention.

For example, FIG. 4 is a flow diagram illustrating several methods according to various embodiments of the invention. The methods 411 are implemented in a machine-accessible and readable medium and are operational over processes within and among networks. The networks may be wired, wireless, or a combination of wired and wireless. The methods 411 may be implemented as instructions, which when accessed by a specific machine, perform the processing depicted in FIG. 4.

In various embodiments, a method 411 that enables UI communication, with synchronous to asynchronous conversion of requests, provides a synchronous query interface to consume asynchronous responses.

The method 411, which executes on one or more processors that perform the method, may begin at block 421. The activity at block 421 may thus include receiving a stateless service request a first time from a user application executing on at least one first machine to open a request operation.

For the purposes of this document, "stateless" is a term that describes a situation in which a computer or computer program is not designed to record one or more preceding events in a given sequence of interactions with a user, another computer or program, a device, or other outside element. A "stateless service request" is a request in which there is no record of previous interactions, so that each request is processed based entirely on information that comes with it. The Internet's basic protocol, the Internet Protocol (IP), is an example of a stateless interaction. HTTP, an application layer which resides above the IP, is also stateless. In each case, communications are discrete and not explicitly related to those that precede or follow them.

The user application may comprise a number of applications, such as a database query graphical user interface. Thus, the user application may comprise a graphical user interface displayed within a browser, among others.

The stateless service request may be received according to a variety of protocols. Thus, the activity at block 421 may comprise receiving the stateless service request as a request for data, perhaps formatted according to the HyperText Transport Protocol.

The first time the request is transmitted, a unique service request ID is generated to identify the request. This activity may occur at block 427. Once the service request ID is generated, it can be sent to the user application.

Thus, in response to receiving the request at block 421, the method 411 may continue on to block 433 with synchronously transmitting the service request ID to the user application in reply to the first time the service request is sent, closing the request operation.

A synchronous-to-asynchronous conversion agent associated with the user application can be used to manage service request communications. In some embodiments, the user interface communicates synchronously with the application layer. The application layer may use one or more proxies to switch to asynchronous communication, and the proxies can then be used to call back end systems using asynchronous communication. In this way, a backend system coupled to the application layer may be used to process an asynchronous request. Thus, a synchronous-to-asynchronous conversion component uniquely associated with the user application may act as an agent to dispatch the stateless service request in an asynchronous manner. This component may form a part of the user application in some embodiments.

The method 411 may thus continue on to block 437 with dispatching the service request as an asynchronous request to an application layer executing on at least one second machine. When the response to the asynchronous request from the application layer becomes available, the service request ID can be used to identify the response.

The stateless request that is originally received may result in multiple asynchronous queries being dispatched. Thus, the activity at block 437 may comprise dispatching multiple queries associated with the service request identification.

Polling can be used to determine when a response to the asynchronous request is available. Thus, the method 411 may continue on to block 441 with polling the application layer to determine when a response to the request, including the data, is available for consumption by the user application.

The service request ID can be used in the polling operation as a mechanism for associating a particular request with a particular response. Thus, the activity at block 441 may comprise polling the application layer using the service request ID.

Polling continues at blocks 441 and 445 until, at some point, it is discovered that the response, including the data requested by the first service request, has been stored at block 443.

The response may be stored temporarily, so that it is available for synchronous recall by the user application (e.g., via the synchronous-to-asynchronous conversion agent). Thus, the method 411 may include, at block 443, storing the response in a temporary data store in conjunction with the service request ID. The storage medium may constitute main memory, or some type of persistent storage, in various embodiments.

The method 411 may continue on to block 453 with synchronously notifying the user application that a response to the asynchronous request is available for consumption. When multiple queries are dispatched, the conversion agent (operating to transform synchronous operations to asynchronous operations and vice versa) may notify the user application as the response to each query becomes available. The agent may therefore comprise a framework that runs in the background and performs small footprint polls using the issued service request ID. Once the agent receives an acknowledgement that the response to the query is available, the agent executes another service request (this time in conjunction with the service request ID), on behalf of and by way of the user application—see block 457. Thus, the activity at block 453 may comprise synchronously notifying the user application that at least one of multiple responses to the asynchronous request is available for consumption.

The method 411 may go on to include transmitting the service request a second time (to include the generated service request ID) at block 457. The method 411 may continue on to block 461 to include receiving the stateless service request a second time from the user application, along with the service request ID, to re-open the request operation.

When multiple responses to a single request are made available to the user application, the user application can make multiple second requests prior to closing the operation. These requests can be made as the user application is notified that each part of the response becomes available, so that the user application can continue processing without waiting for all parts of the response to become available. An example of this might include a user application operating to fill a spreadsheet column by column, where the data for each column is supplied by a different back end system, without the user application having to wait for all back end systems to respond to the original request. In this case the user can view the columns as they are filled, without waiting for the data for all columns to be supplied. Thus, the activity of receiving the stateless service request the second time at block 461 may further comprise receiving the stateless service request multiple times to synchronously provide corresponding multiple responses to the user application.

If the response is received, as determined at block 465, then the method 411 may continue on to include synchronously transmitting the response to the user application in reply to the second time to close the request operation at block 469. Otherwise, if no response is received (perhaps within a predefined time period) at block 465, the method 411 may continue on to block 473 to report an error to the user.

The methods described herein do not have to be executed in the order described, or in any particular order. Moreover, various activities described with respect to the methods identified herein can be executed in repetitive, serial, or parallel fashion. The individual activities of the methods shown in FIG. 4 can also be combined with each other and/or substituted, one for another, in various ways. Information, including parameters, commands, operands, and other data, can be sent and received in the form of one or more carrier waves. Thus, many other embodiments may be realized.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, logic, or managers that operate to perform one or more operations or functions. The modules, logic, and managers referred to herein may, in some example embodiments, comprise processor-implemented modules, logic, or managers.

Similarly, the methods described herein may be at least partially processor-implemented. For example, at least some of the operations of any one method may be performed by one or more processors or processor-implemented modules. The performance of certain operations may be distributed among the one or more processors, not only residing within a single machine, but deployed across a number of machines. In some embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)). Many embodiments may thus be realized.

Figure 5:
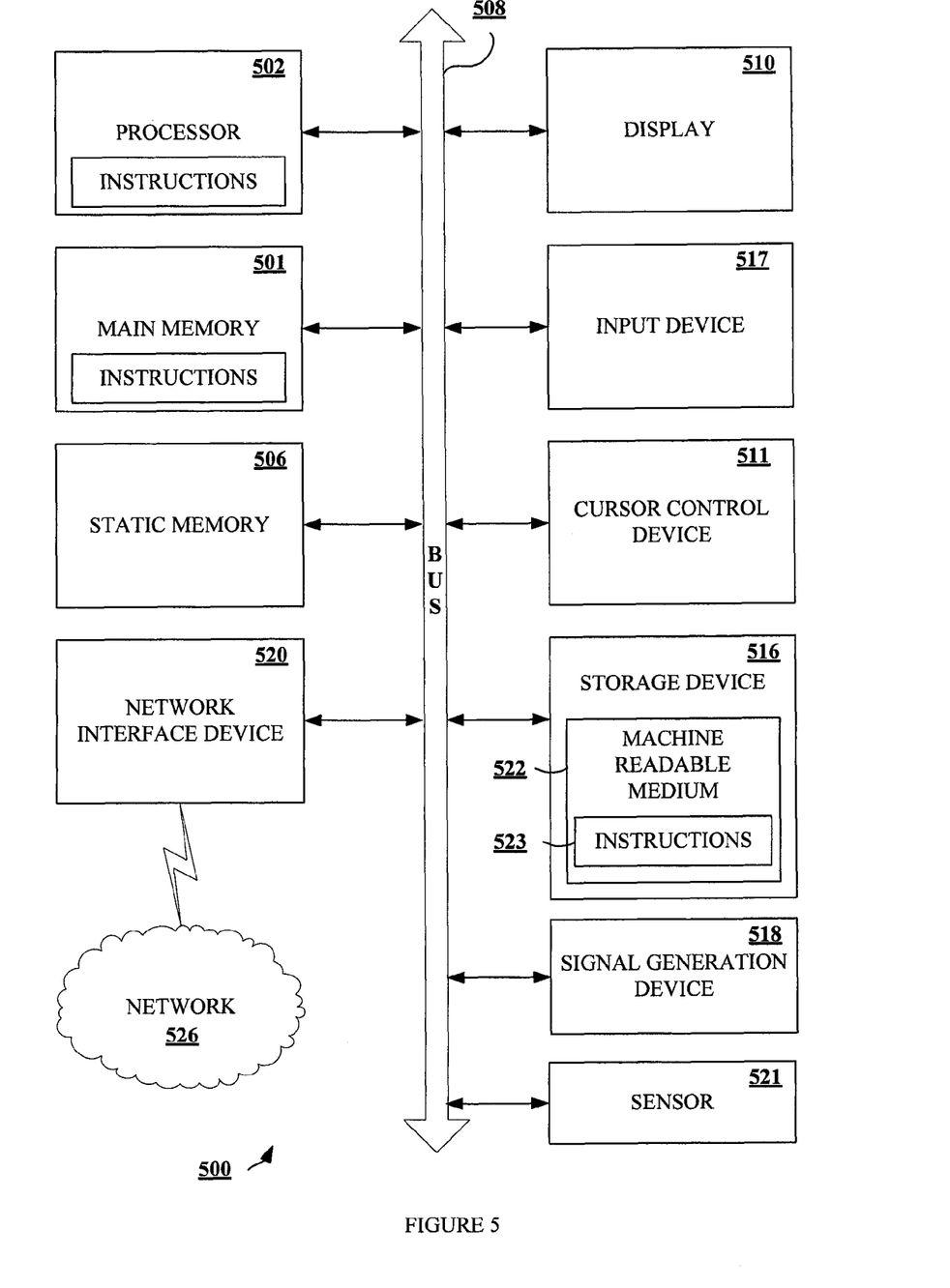
FIG. 5 is a block diagram of an article of manufacture, in the form of a specific machine, according to various embodiments of the invention.

For example, FIG. 5 is a block diagram of an article of manufacture 500, including a specific machine, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand that various programming languages may be employed to create one or more software programs designed to implement and perform the methods and algorithms disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article of manufacture 500, such as a computer, a memory system, a magnetic or optical disk, some other storage device, and/or any type of electronic device or system may include one or more processors 502 coupled to a machine-readable medium 522 such as a memory (e.g., removable storage media, as well as any memory including an electrical, optical, or electromagnetic conductor) having instructions 523 stored thereon (e.g., computer program instructions), which when executed by the one or more processors 502 result in the machine performing any of the actions described with respect to the methods above. In some embodiments, the article of manufacture comprises a tangible medium 522, such as a CD-ROM or other non-volatile memory, to store the instructions 523.

In some embodiments, a computer system may operate as a specific machine that includes a processor 502 (e.g., a central processing unit (CPU), a graphics processing unit (GPU) or both), a main memory 501 and a static memory 506, which communicate with each other via a bus 508. The computer system may further include a display unit 510, an alphanumeric input device 517 (e.g., a keyboard), and a user interface (UI) navigation device 511 (e.g., a mouse). In one embodiment, the display, input device and cursor control device form part of a touch screen display. The computer system may additionally include a storage device (e.g., drive unit 516), a signal generation device 518 (e.g., a speaker), a network interface device 520, and one or more sensors 521, such as a global positioning system sensor, compass, accelerometer, or other sensor.

The computer system may comprise a specific machine within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In some embodiments, the machine comprises any one of a server, a personal computer (PC), a tablet PC, a set-top box (STB), a PDA, a mobile telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set or multiple sets) of instructions to perform any one or more of the methodologies discussed herein. The article of manufacture 500 may be similar to or identical to the apparatus 300 or system 310 of FIG. 3.

Returning to FIG. 5, it can be seen that the drive unit 516 includes a machine-readable medium 522 on which is stored one or more sets of instructions and data structures (e.g., instructions 523) embodying or utilized by any one or more of the methodologies or functions described herein. The instructions 523 may also reside, completely or at least partially, within the main memory 501 and/or within the processor 502 during execution thereof by the computer system, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible, non-transitory medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The instructions 523 may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Implementing the apparatus, systems, and methods described herein may operate to enable multiple, parallel asynchronous service calls to be made to a back end system, all triggered from a central, synchronous user interface cockpit. During execution of the parallel service calls, the synchronous user interface is mostly free to allow the user to continue working while individual results from each back end service are generated. More efficient allocation of processing resources, and increased user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus including a processing node, the processing node comprising:
 a data reception module to receive a first service request for data from a user application executing on at least one first machine; and
 a communications module to communicate with the data reception module, the communications module being implemented by one or more hardware processors and being configured
 to synchronously transmit a first response including a service request identification to the user application in reply to the first service request and to dispatch the first service request as an additional request to an application layer executing on at least one second machine,
 to poll, based on the service request identification, the application layer for a second response to the additional request, responsive to dispatching the additional request to the application layer,
 to receive the second response to the additional request, and to store the second response in a data structure in conjunction with the service request identification,
 to notify the user application that the second response including the data is available for consumption, and
 to receive a second service request from the user application, along with the service request identification, to access the second response from the data structure based on the service request identification received with the second service request, and to synchronously transmit the second response to the user application in reply to the second service request.

2. The apparatus of claim 1, further comprising:
 a display module to display a user interface comprising a portion of the data.

3. The apparatus of claim 1, wherein the first service request and the second service request are stateless service requests, and wherein the additional request is an asynchronous request.

4. The apparatus of claim 1, comprising:
 multiple processors, wherein the proecessing node comprises a first one of the multiple processors, wherein the communications module comprises a software module to be executed by a second one of the multiple processors, and wherein the processing node comprises one of a server or a client.

5. A system, comprising:
 a first processing node comprising a data reception module to receive a first service request for data from a user application executing on at least one first machine; and
 a second processing node comprising a communications module to communicate with the data reception module, the communications module
 to synchronously transmit a first response including a service request identification to the user application in reply to the first service request and to dispatch the first service request as an additional request to an application layer executing on at least one second machine,
 to poll, based on the service request identification, the application layer for a second response to the additional request, responsive to dispatching the additional request to the application layer,
 to receive the second response to the additional request, and to store the second response in a data structure in conjunction with the service request identification,
 to notify the user application that the second response including the data is available for consumption, and
 to receive a second service request from the user application, along with the service request identification, to access the second response from the data structure based on the service request identification received with the second service request, and to synchronously transmit the second response to the user application in reply to the second service request.

6. The system of claim 5, wherein at least one of the first processing node and the second processing node further comprises a display module to display a user interface comprising a portion of the data.

7. The system of claim 5, wherein the first service request and the second service request are stateless service requests, and wherein the additional request is an asynchronous request.

8. The system of claim 5, wherein the first processing node comprises a first processor, wherein the communications module comprises a software module to be executed by a second processor, and wherein the first processing node comprises one of a server or a client.

9. A method, comprising:
 receiving a first service request for data from a user application executing on at least one first machine;
 in response to the receiving, synchronously transmitting a first response including a service request identification to the user application in reply to the first service request, and dispatching the first service request as an additional request to an application layer executing on at least one second machine;
 polling, based on the service request identification, the application layer for a second response to the additional request, responsive to dispatching the additional request to the application layer;
 after receiving the second response to the additional request, storing the second response in a data structure in conjunction with the service request identification;
 notifying the user application that the second response, including the data, is available for consumption;
 receiving a second service request from the user application, along with the service request identification;
 accessing the second response from the data structure based on the service request identification received with the second service request; and
 synchronously transmitting the second response to the user application in reply to the second service request.

10. The method of claim 9, farther comprising:
 displaying a user interface comprising a portion of the data.

11. The method of claim 9, wherein the first service request and the second service request are stateless service requests, and wherein the additional request is an asynchronous request.

12. The method of claim 9, wherein the first service request is received at a processing node comprising a processor, and wherein the processing node comprises one of a server or a client.

13. The method of claim 9, wherein the first service request for data does not include the service request identification.

14. The method of claim 9, further comprising:
 generating the service request identification, responsive to receiving the first service request for data,
 wherein the service request identification uniquely identifies the first service request for data.

15. The method of claim 9, wherein the notifying includes transmitting a notification indicating that the second response corresponding to the service request identification is ready for consumption.

16. An article comprising a non-transitory computer-readable storage medium containing executable instructions stored thereon which, when executed, result in operations comprising:
- receiving a first service request for data from a user application executing on at least one first machine;
- in response to the receiving, synchronously transmitting a first response including a service request identification to the user application in reply to the first service request, and dispatching the first service request as an additional request to an application layer executing on at least one second machine;
- polling, based on the service request identification, the application layer for a second response to the additional request, responsive to dispatching the additional request to the application laver;
- after receiving the second response to the additional request, storing the second response in a data structure in conjunction with the service request identification;
- notifying the user application that the second response, including the data, is available for consumption;
- receiving a second service request from the user application, along with the service request identification;
- accessing the second response from data structure based on the service request identification received with the second service request; and
- synchronously transmitting the second response to the user application in reply to the second service request.

17. The article of claim 16, wherein the operations further comprise:
- displaying a user interface comprising a portion of the data.

18. The article of claim 16, wherein the first service request and the second service request are stateless service requests, and wherein the additional request is an asynchronous request.

19. The article of claim 16,
- wherein the first service request is received at a processing node comprising a processor, and wherein the processing node comprises one of a server or a client.

* * * * *